United States Patent [19]

Andrews et al.

[11] 4,017,234
[45] Apr. 12, 1977

[54] MULTIPLE ROTARY CASTING MACHINE

[75] Inventors: Theodore E. Andrews, Kutztown; John J. Weller, Emmaus; Rudolph T. Benson, Jr., Walnutport, all of Pa.

[73] Assignee: Armstrong Cork Company, Lancaster, Pa.

[22] Filed: June 18, 1976

[21] Appl. No.: 697,685

Related U.S. Application Data

[63] Continuation-in-part of Ser. No. 554,549, March 3, 1975, abandoned, which is a continuation of Ser. No. 383,072, July 27, 1973, abandoned.

[52] U.S. Cl. .............................. 425/145; 425/4 R; 425/159; 425/258; 425/435; 425/450.1; 425/817 R
[51] Int. Cl.² ...................................... B29D 27/04
[58] Field of Search .......... 425/145, 258, 425, 435, 425/817 R, 4 R, 159, 110, 450.1, 117

[56] References Cited

UNITED STATES PATENTS

| 2,042,975 | 6/1936 | West .............................. 425/435 X |
| 3,293,024 | 12/1966 | Luertzing ...................... 425/435 X |
| 3,328,836 | 7/1967 | Axelsson ...................... 425/817 R X |
| 3,574,888 | 4/1971 | Holaday ............................ 425/117 |
| 3,790,320 | 2/1974 | Snelling et al. .................... 425/4 R |

Primary Examiner—Robert L. Spicer, Jr.
Attorney, Agent, or Firm—Hopgood, Calimafde, Kalil, Blaustein & Lieberman

[57] ABSTRACT

A machine and method are disclosed whereby multiple casting units simultaneously produce foamed-plastic tubular articles which may be of different shapes and sizes. All units are served from a single supply of foamable material, and in each unit rotation of an annular mold develops a homogenous longitudinal and radial distribution of foaming plastic. The foaming plastic is introduced into each mold rotation, the cavity being closed to permit foamed filling of the mold, and a polymerizing cure is effected prior to mold opening and product removal. The particular machine herein described includes provision for coordinated shot size for foamable material into each of the plural mold cavities, whereby regardless of the mold-cavity size at particular casting units, the shot size (of foamable plastic material) is automatically determined, for uniform or predetermined density in the ultimate products regardless of size variation produced at the respective casting units.

10 Claims, 19 Drawing Figures

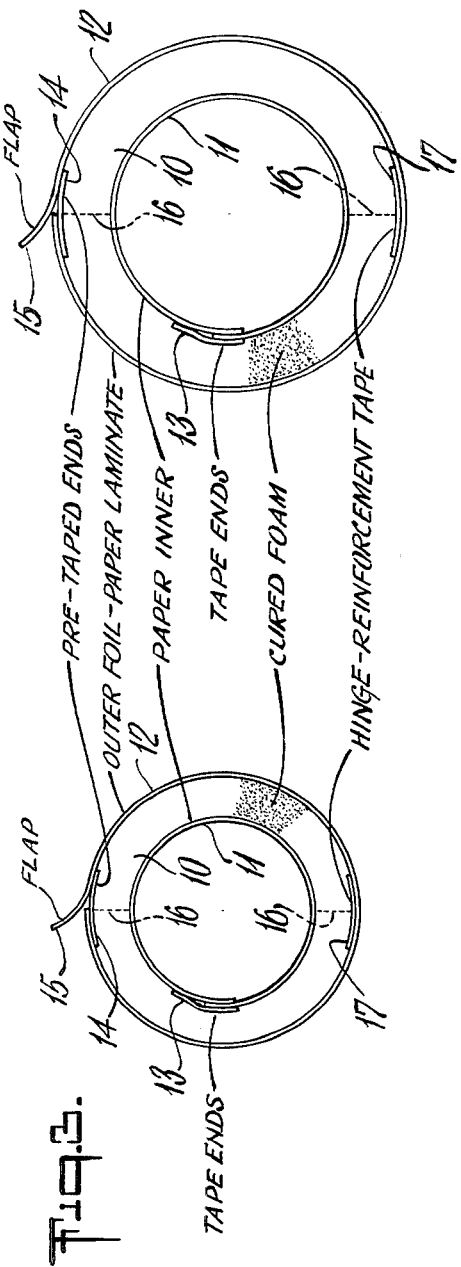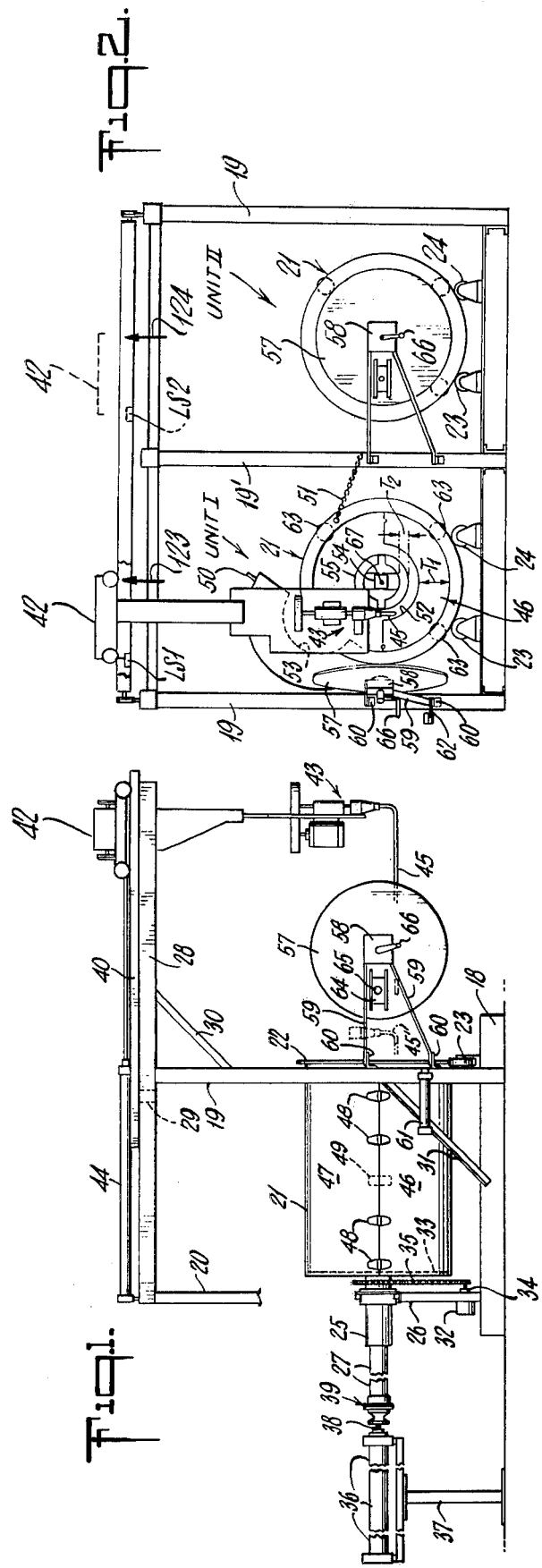

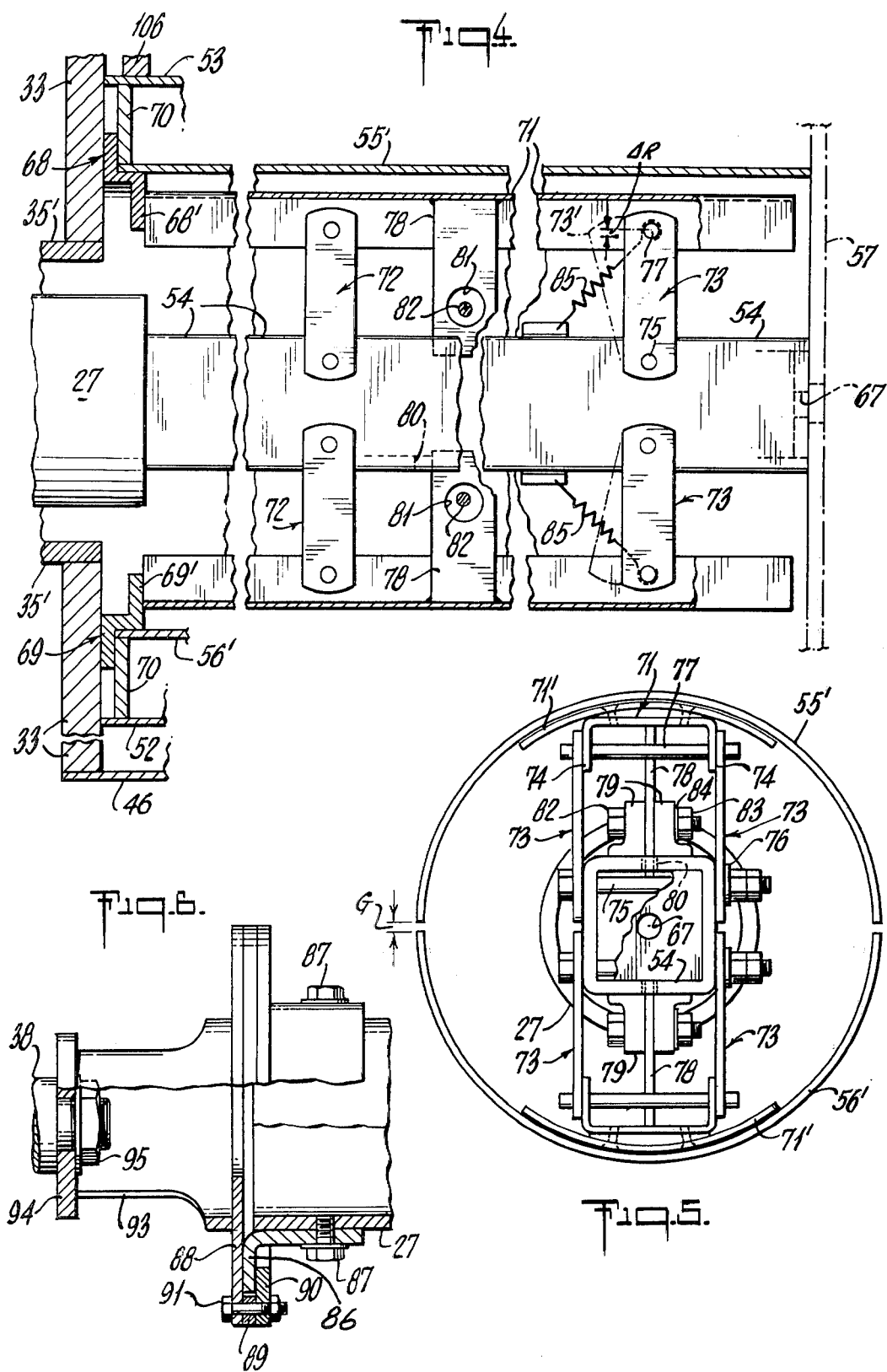

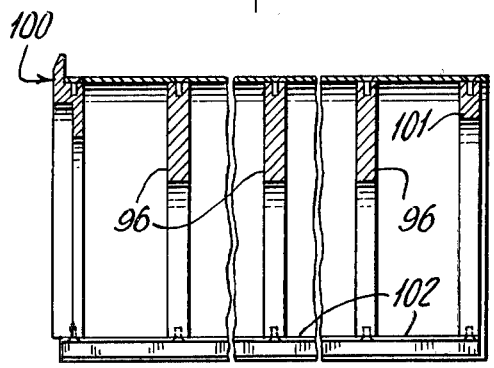
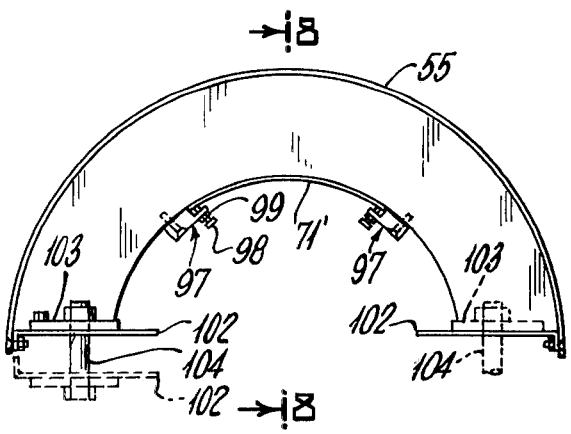
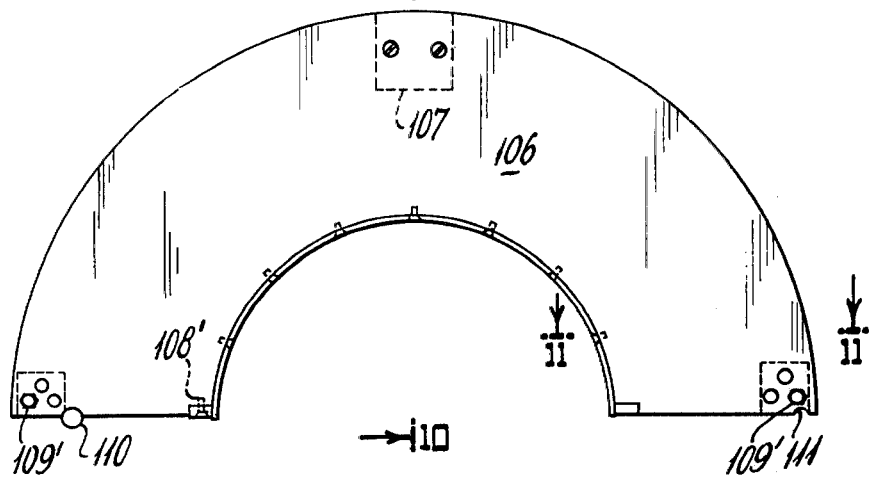
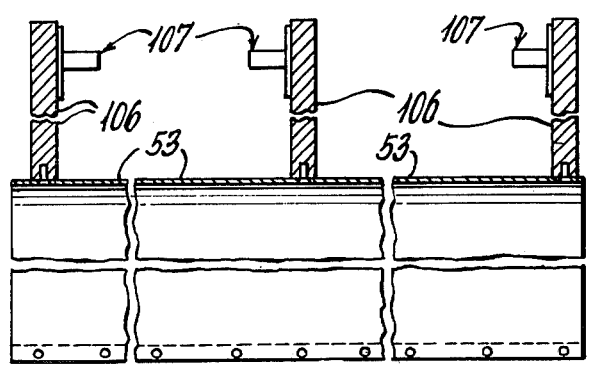
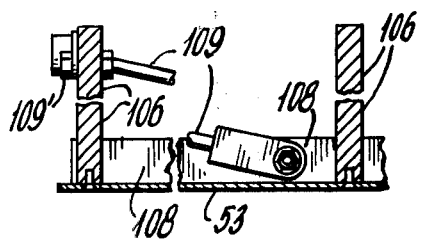

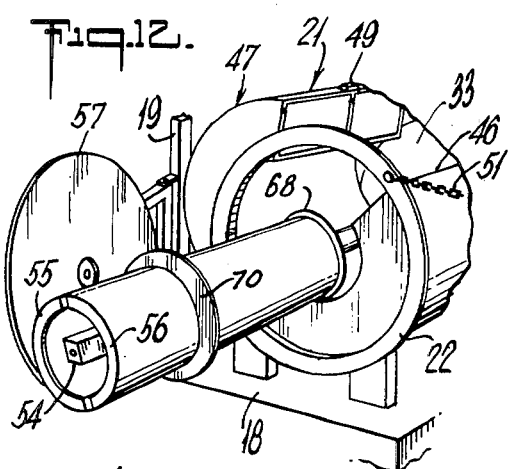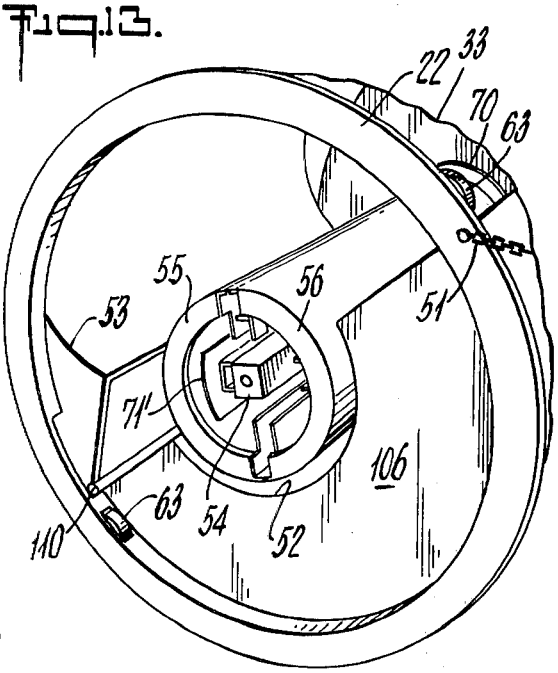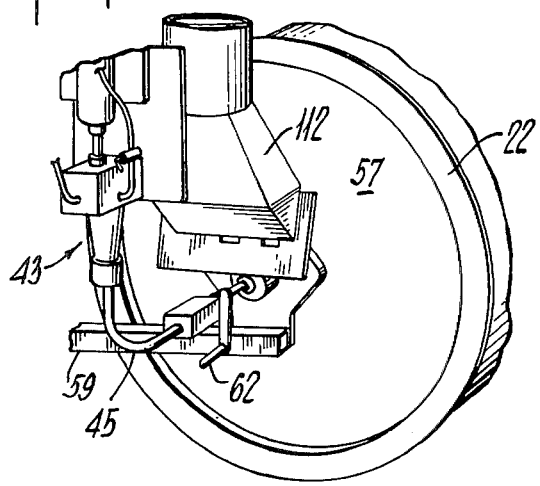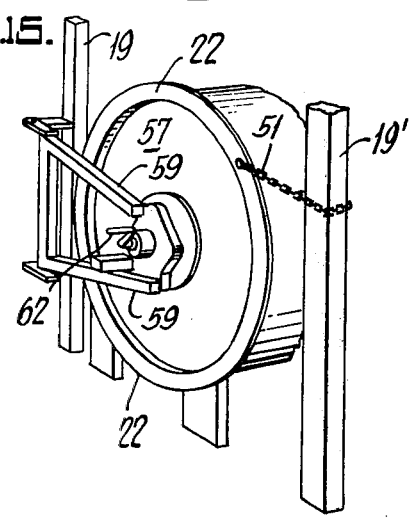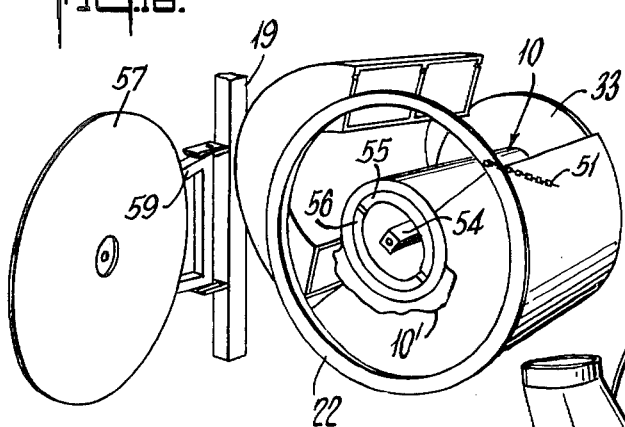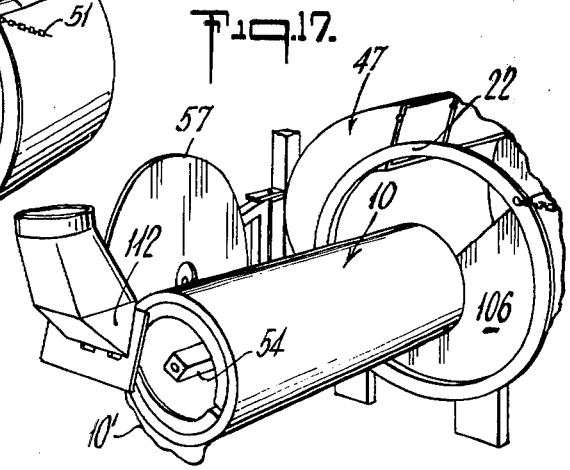

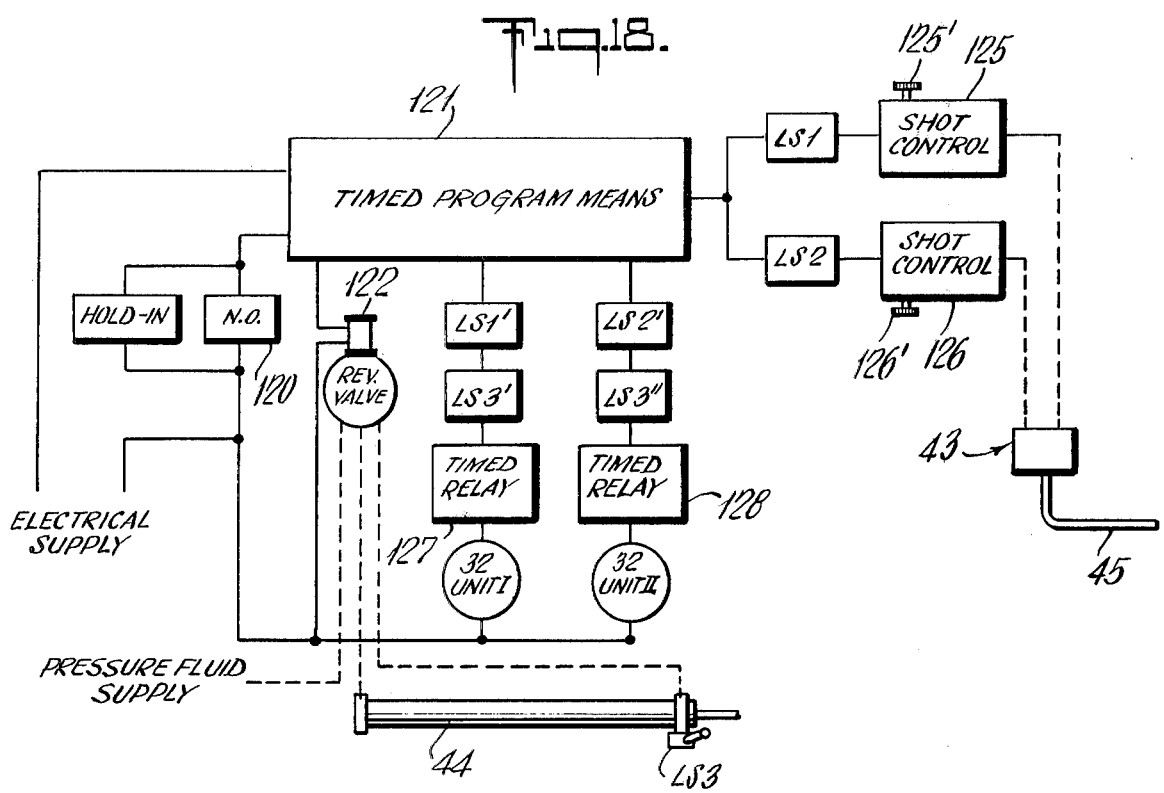
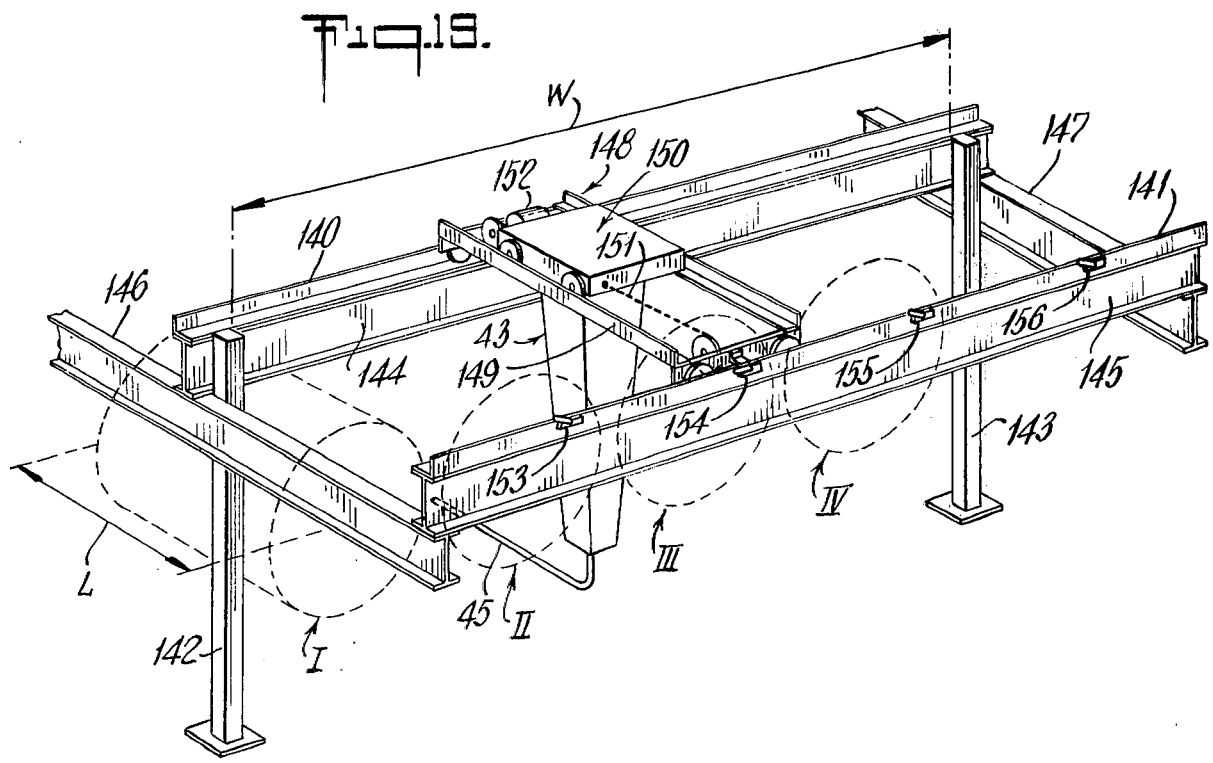

MULTIPLE ROTARY CASTING MACHINE

RELATED U.S. APPLICATIONS

This application is a continuation of our copending application, Ser. No. 554,549, filed Mar. 3, 1975, now abandoned; which in turn is a continuation of our application, Ser. No. 383,072, filed July 27, 1973, now abandoned.

This invention relates to a means and method of producing homogeneous tubular castings of foamed-plastic material, as for example, cylindrical castings of pipe-insulating conduit. In particular, this invention is directed to rotary casting machines of the character indicated, as disclosed in U.S. Pat. No. 3,790,320, issued Feb. 5, 1974.

It is an object of the invention to provide an improved method and means of the character indicated.

Another object is to provide an improved machine and method inherently adapted to economical production of foamed tubing in discrete unit lengths.

A further object is to provide an improved machine and method inherently adapted to economical production of foamed tubing of unusually large sizes, as well as to simultaneous production of tubing of different sizes.

It is also an object to achieve the above objects with a machine and method adapted to ready changeover from one or more to selected others of a relatively large variety of sizes, with regard to inner and outer diameter and with regard to thickness.

A general object is to achieve the foregoing with an absolute minimum of material waste, with a minimum of down-time for size changeover, and with an inherent capacity to produce the finest-quality product, adhering to close tolerance limitations.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIG. 1 is a simplified view in elevation of a multiple rotary-casting machine embodying the invention;

FIG. 2 is a right-end view of the machine of FIG. 1, showing plural casting units;

FIG. 3 is an end view of two concurrent products of the method and means of the invention, with legend identification of illustrative component elements;

FIG. 4 is an enlarged fragmentary view, partly broken-away and in section, of inner-mold elements of one of the casting units of FIGS. 1 and 2;

FIG. 5 is a right-end view of the structure of FIG. 4;

FIG. 6 is a fragmentary longitudinal sectional view of a coupling in the actuating and supporting means for the structure of FIGS. 4 and 5;

FIG. 7 is an end view of an inner-mold part usable in the machine of FIGS. 1 and 2;

FIG. 8 is a partly broken, sectional view, taken in the plane 8—8 of FIG. 7;

FIG. 9 is an end view of an outer-mold part usable in the machine of FIGS. 1 and 2;

FIG. 10 is a partly broken sectional view, taken in the plane 10—10 of FIG. 9;

FIG. 11 is a view similar to FIG. 10 to show a modification;

FIGS. 12 to 17, inclusive, are simplified views in perspective to illustrate steps in a casting unit of FIGS. 1 and 2;

FIG. 18 is a simplified diagram schematically indicating certain control connections in the machine of FIGS. 1 and 2; and FIG. 19 is a simplified view in perspective to illustrate modified movable support structure in an employment of a larger plurality of rotary-casting units.

In FIGS. 1 and 2, the invention is shown in application to a multiple rotary-casting machine for producing foamed-plastic tubular articles, such as the two sizes of pipe-insulation conduit shown in FIG. 3. In general, each such conduit product comprises a standard length, for example a four-foot length, of cured foamed plastic material 10, intimately bonded to inner and outer sheaths 11-12, which may be of flexible plastic or paper sheeting; for insulating purposes, the outer sheath 12 is preferably a laminate incorporating a reflective metallic foil. The products in FIG. 3 differ as to thickness and as to at least one of their surface diameters.

FIG. 3 additionally reveals that for each conduit product the inner sheath 11 is wrapped from flat sheet stock, with overlapping ends secured as by pressure-sensitive adhesive tape 13. In like manner, tape 14 secures the ends of the outer sheath 12, leaving an external flap 15 which is used by the customer to make his installation. Before shipment to the customer, the articles of FIG. 3 are longitudinally sliced into semi-cylindrical halves, divided at the diametrical alignment 16 and hinged at a reinforcing hinge tape 17 which is pre-assembled to the inner surface of outer sheath 12. The flap 15 remains after slicing, as by the slitting machine disclosed in U.S. Pat. No. 3,715,941, issued Feb. 13, 1973, and is used to lap adjacent severed edges of the conduit after its assembly over a length of pipe.

The machine of FIGS. 1 and 2 comprises a rigid floor-mounted frame, built on a base 18 and including upstanding front and rear members 19-20; the frame includes means for the independent rotational support of plural like rotary-molds (labeled in FIG. 2 as Unit I and Unit II, respectively), being cylindrical mold assemblies 21, shown on spaced parallel horizontal axes. For each of Units I and II, two of the three points of mold support are provided by an end flange 22 of the mold assembly, riding spaced frame-based idler rolls 23-24 at the front end; the remaining point of support is established by a bearing 25 on a standard 26, which may form part of the rear upright structure 20. A tubular tailpiece 27 forms part of each mold assembly 21 and is longitudinally slidable and rotatable in the associated bearing 25. Upper longitudinal members 28 secure the upstanding members 19-20 on the respective sides of the mold assembly, being fixedly spaced by a tie member 29, a central further upstanding member 19' being shown connected to member 29. Corner braces 30-31 establish the rigid integrity of upper and lower ends of the upright frame members 19-20 to the horizontal members 28. For each of Units I and II, an electric motor 32, mounted to standard 26, provides rotary drive to the rear wall 33 of the associated mold assembly, via reduction gearing 34 and sprocket means 35; the speed of mold rotation is relatively slow, being preferably such as to induce less than 1 g modulation in the gravity vector applicable to moldable material within mold 21. For each of Units I and II, fluid-pressure operated means 36 is floor-mounted on a rear pedestal 37 and includes a double-acting rod 38, coupled by means 39 to the associated tailpiece 27.

Parallel longitudinal rails 40 atop members 28 longitudinally guide the wheels of a carriage 41 which spans the width of the described frame and which includes orthogonally guided underslung structure 42 for carrying a head 43 for the mixing and mold-feeding of ingredients of foamable molding material; as seen in FIG. 2, the structure 42 is roll supported on rail formation which extend along carriage 41. Fluid-pressure operated means 44 carried by upper members 28 provide double-acting positioning drive to carriage 41 along its rails 40; such displacement mechanism is used to advance an elongate discharge pipe 45 (at the downstream end of head 43) longitudinally into and out of the cavity within either selected one of the molding assemblies 21, all as will be more fully explained.

Each molding assembly 21 is contained within a large external cylinder or shell, comprising semi-cylindrical segmental elements 46–47, hinged at 48 along one pair of their adjacent outer longitudinal edges and releasably clamped along the other pair of their adjacent outer longitudinal edges; such clamping is suggested by dashed outlines 49 in FIG. 1, at what will be understood to be a location diametrically opposite to the hinge axis of means 48. The semi-cylindrical shell element 46 includes the rear end wall 33 by which tailpiece 27 is secured to the molding assembly; at its front end, element 46 includes the front-supporting annular flange 22. On the other hand, when clamp means 49 is released and with shell element 46 positioned generally below the central axis of the mold assembly (not shown), the other shell element 47 may be raised bout its hinge connection 48, as by lifting the same by a handle 50 to the raised position shown for Unit I in FIG. 2. A removable chain connection 51 from part of flange 22 to part of an adjacent frame member will hold the mold assembly against rotation when opening a mold element, such as the movable shell element 47.

The outer shell elements 46–47 serve as mounting references for a selected set of insert mold elements, of selected thickness $T_1$, for the coaxial positioning of semi-cylindrical arcuate outer-mold segments 52–53 about the mold axis; these insert parts will be more fully described in connection with FIGS. 9 to 11. The bore of the finished article (FIG. 3) is defined by collapsible inner-mold structure based on a central mandrel 54, which is united with tailpiece 27 over a region of telescoped overlap therewith in the vicinity of bearing 25; mandrel 54 is shown conveniently formed of square tubing and extends the full length of the inner volume of the mold assembly 21 when actuator 36 is in the fully retracted position shown in FIG. 1. Mandrel 54 is thus always a cantilevered projection behond bearing 25, and in the fully advanced condition of actuator 36, mandrel 54 is fully projected beyond the open end of the mold assembly 21. Semi-cylindrical inner-mold segments 55–56 are removably secured to the retractable structure borne by mandrel 54; the segments 55 56 are selected as a set, appropriate to the desired inside diameter or other contour of the molded product (FIG. 3) and will be more fully described in connection with FIGS. 7 and 8.

To complete the general identification of parts in FIGS. 1 and 2, a circular door 57 is rotatably supported at bearing means 58 offset by a bracket or arm 59 having a hinged connection to the frame; as shown, the hinge axis is vertical, being conveniently provided at hinge lugs 60 on one of the front uprights 19—19', for the respective Units I and II. For each door 57, pressure-fluid actuating means 61 having a linked connection to a crank offset 62 of bracket 59 facilitates door manipulation from the fully open position shown in FIGS. 1 and 2 (Unit I), to a fully closed position (FIG. 2, Unit II) in which door 57 is faced to the described mold parts, within the annular flange 22. Flange 22 is shown fitted with plural spaced idler rollers 63, having preferably crowned outer contours, to receive and coaxially locate door 57 in its closed position. A radially guided gate 64 in each door 57 has an opening 65 to insertably receive the tube or wand 45 for injecting foaming material into the otherwise closed particular mold assembly 21, as part of the molding procedure which will be more fully described. Finally, clutching means including a hand crank 66 provides for selective clutching of each door 57 to its mandrel 54 after molding material has been injected into and wand 45 removed from the mold assembly 21; the hand-crank 66 will be understood, for example, to be rotatable within the rotary bearing for door 57 and to have an inwardly projecting threaded end, engageable in a matching tapped hole 67 in the forward end face of the mandrel 54, so that door-clutching to mandrel 54 results from hand-cranked bolting at 67.

FIGS. 4 and 5 provide detail of the mandrel 54, its retraction mechanism, and the means for support of inner-mold segments, the latter being identified 55'–56' in FIGS. 4 and 5 because they are there shown for the smallest size which can be accommodated by the particular retraction mechanism. Mandrel 54 is shown for its longitudinally retracted position wherein semi-circular flange members 68–69, which define and reinforce the rear ends of segments 55'–56', are abutted to the rear wall 33 of the mold assembly 21. This is the condition of readiness for molding and for accepting closure of door 57 (phantom outline), to abutment with the front ends of mandrel 54 and the mold segments 55'–56' and 52–53, the latter being shown as small fragments in left corners of FIG. 4. Each of the semi-circular flanges 68–69 comprises a radially outward portion for abutment with wall 33 and serving as a stop for a circumferentially continuous backing ring or plate 70 to close the annular space between inner and outer mold segments and thus define the back axial end of the molded product. Flanges 68–69 also include a radially inward portion 68' (69') for coaction with the retraction mechanism, as will be explained.

It will be recalled that back wall 33 is the part of the mold assembly 21 to which rotary drive is imparted by sprocket means 35; in FIG. 4, the broken-away member 35' secured to wall 33 will be understood to be a part of this drive system, as for example part of the hub of the toothed wheel by which sprocket connection is made to the drive means 32–34. Wall 33 is thus a large circular plate to which the outer-shell part 46 if fixedly mounted, and to which the other outer-shell part 47 is hingedly closed.

Each of the inner-mold segments 55'–56' is served by its own retraction mechanism, which is basically a four-bar linkage wherein an elongate channel 71 and the mandrel 54 are the two longitudinally extending parallel members, and wherein at least two longitudinally spaced parallel and radially extending link means 72–73 complete the linkage. An elongated cylindrically arcuate shoe plate 71' is fixedly carried by channel 71 and is effectively a part thereof; shoe plate 71' is the means of removably mounting a selected inner-mold segment 55'(55) to the collapsible supporting structure.

The detailed description which will be given to the upper four-bar linkage, for mold element 55' in FIG. 4, will be understood to apply for all such linkages, meaning for the lower element 56' in the case of the two-segment inner mold structure shown.

Channel 71 extends almost the full longitudinal extent of the mold cavity, being shown in radially slidable, axial abutment with the end flange portion 68', and in axially spaced relation with the front radial end plane of the mold cavity, established by the inner surface of the closed door 57. Conveniently, the side walls 74 of flange 71 define an overall channel width which matches the width of mandrel 54, and each of the link means 72–73 is a pair of link straps, as shown. Thus, the pair of straps for link means 73 ride outer cheeks of the longitudinal members 54 71; they are pinned to mandrel 54 by a single bolt 75, lock-nutted to desired loading via washer means 76, and they are connected to channel walls 74 by a pin 77 which is readily removable, as suggested in FIG. 5 by cotter-pin holes in pin 77. The radial displacement of each channel 71 is stabilized by a plurality of longitudinally spaced guide plates 78, centrally welded to the bottom of the channel 71 and having limited freedom of small axial and radial displacement between adjacent spaced guide faces of a pair of lug brackets 79 fixed to mandrel 54. Each plate 78 is free to pass through local opening 80 in the mandrel and is provided with an oversize aperture 81 to accommodate the shank of a clamp bolt 82. A nut 83 frictionally loads the clamp via a lock washer 84 to the extent needed to achieve wobble-free guidance of plate 78, as will be understood. A tension spring 84 between pin 77 and a fixed point on the mandrel provides rearwardly biased loading of the four-bar linkage, in the collapsing direction; the extent of such collapse is limited by edge abutment of the inner-mold segments 55'–56', upon closure of the gap G (FIG. 5), at which closure the link means 73 will have displaced from the fully extended position (full lines in FIG. 4) to the retracted position (light phantom outline 73').

It will be seen that, upon initial forwardly thrust displacement of mandrel 54 (via its tailpiece 27), spring tension at 84 (aided by drag friction due to the presence of molded product between segments 52–53 and 55'–56') is operative to collapse the inner-mold segments, to the extent of the radial decrement ΔR. The closed gap G determines a collapsed abutment of outer longitudinal member 71 of the two opposed four-bar linkages, so that back flanges 68 can positively drive the backing ring 70 to expel the molded product as the mandrel continues its forward stroke. Once clear of the shell structure 46–47, the molded product is externally accessible and free for manual or automatic extraction from the collapsed inner-mold structure.

FIG. 6 is a fragmentary, partly broken-away and longitudinally sectioned view of the coupling means 39 (FIG. 1) between the piston rod 38 and the mandrel tailpiece 27. This coupling is designed to allow rotation of tailpiece 27 without necessarily inducing rotation of the rod 38. A first radial flange fitting 86 has a hub bolted at 87 to tailpiece 27, and a second fitting has a radial flange 88 faced to flange 86 and circumferentially surrounding the same with a running clearance. As shown, the surrounding parts comprise a spacer ring 89 of thickness slightly exceeding that of flange 86, and a retaining ring 90 radially overlapping spacer 89 and flange 86; bolts 91 unite rings 89 90 to flange 88. A tubular adapter neck 92 with a local side-access port 93 connects flange 88 to a centrally apertured plate 94, to which the reduced threaded end of rod 38 is fastened by a nut 95.

FIGS. 7 and 8 illustrate a typical semi-cylindrical inner-mold segmental shell 55 for defining a product-bore diameter substantially larger than the minimum-diameter situation depicted in FIG. 5. Shell 55 is reinforced by plural spaced arcuate ribs 96 of inner radius which conforms to that of the retractable mounting shoe 71'. As shown, ribs 96 are symmetrically astride the shoe 71', being retained by a fastening lug 97 adjacent each shoe-edge intercept with one of the ribs 96. A seen in FIG. 7, the longitudinal edge of the shoe 71' angularly locates against the recessed heel of each lug 97, and a bolt 98 and lock nut 99 are the means for clamping the mold-insert assembly to shoe 71'. Semi-circular end-flange means 100 reinforces the back end of the segmental shell 55 and at the same time provides the backing-ring and mold-expanding abutment functions indicated for flange means 68–69 of FIG. 5. Another but radially thinner semi-circular rib 101 refinforces the forward end of shell 55, and longitudinal edge plates 102 are secured to all ribs 96–100–101 and to adjacent ends of shell 55 to complete the structural integrity of the replaceable inner-mold component.

For larger-size inner-mold components 55, as in FIGS. 7 and 8, a reinforcing plate 102 is secured to both ends of each plate 102. Rugged nut and bolt means 104 pass through aligned openings in adjacent plates 103 of adjacent edge-ends of the two semi-cylindrical component assemblies (for shells 55–56); preferably, the bolt is threaded to the plate 103 adjacent the nut of means 104, so that a locked setting can be established whereby the bolt is a guide for the accurate alignment of adjacent edges of shells 55–56, for each re-setting of the expanded condition of inner-mold components assembled to mandrel 54.

FIGS. 9 to 11 illustrate the outer-mold component analogue for the inner-mold component of FIGS. 7–8. As shown, the inner shell 53 of this component is a semi-cylindrical arcuate segment of what, with its complementary other component 52, will determine the molded outer diameter of the product (FIG. 3). Semi-circular arcuate ribs 106 are secured to shell 53 at longitudinally spaced locations. Each of these ribs builds out the mold-component body radius to match that of the hinged outer shell 47 (FIG. 1) and is provided with anchor lugs 107 having radial tapped holes by which to replaceably secure the component to its shell 47. Longitudinal edge-reinforcement bars 108 secure the alignment of edges of shell 53 and are themselves secured to each of the ribs 106, as suggested by means 108' (FIG. 9). Diagonal rod bracing 109 (FIG. 11) at each of several angular locations and in the space between ribs 106 may be provided, if necessary, to assure integrity of coaxial positioning of all parts of the surface of mold shell 53, as will be understood; in FIGS. 9 and 11 such bracing is shown at the angular extremes, being fastened by nuts 109' at the end face of an end rib 106. Finally, a precision-mounted large dowel 110 on an axis parallel to the axis of hinge means 48 (FIG. 1) is fixed to the radial edge of each rib 106, for mating location in a conforming recess in the corresponding ribs of a similar outer-mold replacement component (for the unhinged remainder 46 of the outer shell); at the diametrically opposite extreme, ribs 106 are locally recessed (at 111) to receive and locate a smaller-size dowel (not shown) carried by the adjaent structure of the unhinged component for mold shell 52. The structure of the component for mold shell 52 is otherwise as described for shell 53, and coaxial registry of shells 52-53 is assured upon setting the clamp means 49 (FIG. 1).

FIG. 18 schematically illustrates certain control-system components, under initiating control of a manual start button 120 having normally open contacts and with a "hold-in" feature. Timed program means 121, started by operation of button 120, serves to determine a cycle of longitudinal reciprocation of carriage 41, through on-off excitation of a solenoid-operating reversing valve 122. The initial stroke of such reciprocation is a retraction to the point where a fixed limit switch LS3 is actuated by carriage 41 (or a part carried thereby). Fixedly mounted at spaced transverse locations on carriage 41 are further limit switches LS1 and LS2, which are poised for actuation by part of the orthogonally guided structure 42 and which are so located as to determine or be operative only at correct plastic-injection locations for the respective casting units I and II; it will be understood that fixed or retractable latch, detent, dog or other step mechanism (suggested by heavy arrows 123-124, FIG. 2) may provide accurate mechanical location of means 42 at stop points in its shuttle motion between the Unit I and Unit II locations. Limit switch LS1 is normally open and thus is operative to select shot-control means for foamable plastic delivered by means 43, ony when in the Unit I location; by the same token, limit switch LS2 is normally open and is thus operative only to select shot-control means 126 when means 42-43-45 is in the Unit II location. Knobs 125'-126 ' on controls 125-126 suggest selective variation of foamable-plastic shots at the Unit I and Unit II locations, respectively, the adjustment being made in accordance with ultimate product density desired in the mold sizes currently set up at these respective locations. Program means 121 is shown with one output connection to both LS1 and LS2, and generally it is desirable to provide this shot-actuating signal at least to commence when the motor-start output signal is given to the appropriate motor 32.

As shown, further normally-open contacts LS1' of the Unit I limit switch LS1 and first normally-open contacts LS3' of the stroke limit switch LS3 are series-connected in a first motor-start output of program means 121, to start a relay 127 for timing the period of running of the Unit I motor 32; in similar fashion, another series connection of limit switch contacts LS2', LS3'' for the Unit II limit switch LS2 and for the stroke limit switch (LS3) are operative to connect a timer relay 128 for the Unit II motor 32.

OPERATION

Operation of the individual rotary-casting mechanisms, i.e., Unit I or Unit II, is generally as described in said U.S. Pat. No. 3,790,320; however, such operation will here be rather fully reviewed having additional reference to the sequence of FIGS. 12 through 17, by reason of the interlaced nature of operating the plural Units I and II. Thus, for Unit I, a cycle may be deemed to start, as by manually operating start button 129 (FIG. 18) just after product removal at completion of the previous cycle.

The situation just prior to cycle start is depicted in FIG. 12, wherein the mandrel 54 (with its inner-mold segmental shell assmblies 55-56) is fully projected out the open end of the mold assembly 21. The four-bar linkages within the inner-mold structure are collapsed, allowing the backing ring 70 to be reassembled and pushed all the way back to abutment with flanges 68-69. The outer-mold assembly 47-107-53 is hinged open, and chain 51 holds the rotatable parts at a convenient angle for an operator's inspection of the entire mold cavity.

Having inspected for cleanliness, and with backing ring placed against flanges 68-69, the actuator 36 is operated to retract mandrel 44 and all inner-mold structure carried thereby. Just prior to reaching the fully retracted position, flanges 68-69 interfere with the back wall 33, causing restoration of inner-mold shells 55-56 to the bore-determining radius desired in the molded product. Upon full retraction, the parts appear as in FIG. 13, in readiness for application of liner materials 11-12 (FIG. 3). The inner liner 11 is a pre-cut paper sheet, applied as a wrinkle-free envelopment of the expanded inner-mold assembly 55-56, the overlapped ends being taped at 13 with the exposed lapping end of the trailing direction, as displayed in FIG. 3 for the assumed case of mold rotation in the counterclockwise direction. The outer liner 12 is also pre-cut, but is preferably pre-taped at 14-17 for conformance to the outer diameter of the molded product; again, the overlapped ends are oriented to present no snag of sheet material by the discharge pipe 45 in the course of injecting mold material between liners 11-12.

Having applied both liners, the hnged outer shell assembly is closed and locked (at 49), and door 57 is actuated to close position. Chain 51 is disengaged from flange 22, and the orthogonally guided structure 42 (which carries the foamable-material supply means or mixing head 43) is transversely positioned for correct Unit I alignment. All is thus ready for an automated cycle of mold injection and plastic curing, initiated by depression of button 120 and governed by timed program means 121.

At the outset of this programmed cycle, solenoid 122 is actuated, so that mixing head 43 is longitudinally advanced to the mold assembly, with its discharge wand 45 entering via port 65 of Unit I into the space between liners 11-12, the initial discharge point being set for a location about 75 percent in fron the door 57, i.e., 75 percent of the length of the mold cavity. The front of the machine then has the appearance depicted in FIG. 14, with an exhaust fixture 112 positioned near the region of escaping fumes; fixture 112 may be retractably carried by the underslung orthogonally guided structure 42.

Substantially coincident with the indicated inward advance of wand 45, motor 32 (for Unit I) is started, to rotate the entire mold assembly 21, except for door 57, since wand 45 holds the door against rotation. Casting now proceeds on a timed cycle of mold material injection (determined at shot control 125), of mold rotation (determined at timer 127), and of wand retraction (actuator 44, determined by pressure fluid reversal at 122). Typically, for casting a 4-foot length of conduit of foamed urethane having a 12-inch outer diameter and a 1.5 inch wall thickness, the advanced position of wand 45 is held for about 3 of the 10 seconds of the foam-feed cycle; mold rotation is in the order of 60 revolutions per minute. The 3-second period allows initial development of a circumferentially continuous body of foaming material at a location near to but short of the back wall 33; wand retraction then proceeds at a pace such that the release of foaming ingredients at head 43 is cut off (i.e., end of the 10-second injection) when discharge from wand 45 is still projected into the cavity, to the extent of about 25 percent of the cavity length. As soon as the wand is removed from the door 57, port 65 is closed, and the door is clutched to the rotating mold (at 67) by operation of crank 66. Rotation is allowed to continue another ten seconds, thus assuring rotation as long as foaming material is filling out the cavity, it being understood that in the course of foam expansion, the outer liner 12 is necessarily forced into smooth and wrinkle-free conformance with outer-mold shells 52–53 and that both liners become bonded to the foamed plastic.

At the end of the ten seconds of mold rotation with door 57 clutched to complete the mold, the rotary drive is terminated and the mold contents are allowed to cure to hardness, for a predetermined period, such as 7 minutes. It is then convenient to set the chain 51 to flange 22. The machine thus has the appearacne depicted in FIG. 15 during the curing phase.

FIG. 16 shows the first phase of product removal, namely, opening the outer mold assembly at 47, and declutching and opening door 57. The small flash 10' of excess cured plastic which appears adjacent one of the ribs 106 is quickly trimmed off, without affecting the integrity or quality of the molded product 10. Door opening is quickly followed by an ejection stroke of actuator 36, to the projected position shown in FIG. 17; this initially removes contact of flanges 68–69 with the back wall 33 and establishes immediate collapse of the inner-mold shells 55–56. The product can be manually pulled off the inner-mold shells, or it can be held and picked off as the actuator 36 retracts the inner-mold assembly.

Having thus performed all the mold-preparatory, mold-injection and mold-filling steps in a relatively small fraction of the total product cycle, the remaining cure time is available (after removal of wand 45 from Unit I) to devote to mold preparation, mold-injection and mold-filling steps at another casting units (Unit II). To this end, the orthogonally guided means 42 is repositioned laterally to the Unit II alignment, determined by stop means 124. Here, the mold is prepared by paper lining as previously described, and limit switch LS2 is already set for determining the correct shot size whenever the operator decides to start the Unit II cycle. He can then have loaded Unit II with foaming material by the time cure is complete at Unit I, and he has plenty of time to open the Unit I mold, remove its product, re-prepare the Unit I mold, shuttle the means 42–43 back to the Unit I position and initiate another cycle thereof, all before the Unit II product has been cured enough to permit removal.

It will be seen that we have described a machine and method meeting all stated objects, and at least doubling output for a single operator, while enabling him to produce two different sizes of product, if desired. The resulting products have excellent homogeneous distribution of foamed material and adhere to tolerance limitations previously unattainable. The change-over to a different size of bore or outer diameter at either or both Unit locations is easily accomplished, and start-up entails negligible waste. The product of the machine and process is ready for immediate use, shipment, and/or slitting, as suggested in the description of FIG. 3.

While the invention has been described in considerable detail for a presently preferred embodiment, it will be understood that modifications may be made without departing from the invention. For example, FIG. 19 is a simplified perspective view to illustrate application of the invention to more than two casting units, four being shown. In FIG. 19, the longitudinal length L for all casting Units I, II, III, IV is small relative to the combined effective wdth W of the array. For this reason, the primary guide-rail system 140–141 is transverse, i.e., orthogonal to the mold axes, and extends the full effective width W between major support columns 142–143. As shown, rails 140–141 are along top edges of beams 144–145, both of which rest on spaced longitudinal beams 146–147 which are in turn securely mounted to columns 142–143. A carriage 148 rides rails 140–141 and itself provides longitudinal rails 149 for longitudinally guided means 150 by which the foamable-material supply and wand 45 are suspended. Fluid-pressure operated means may be again used to generate longitudinal positioning displacements, but we show instead an endless chain 151, driven by motor means 152. To avoid confusion, chain 151 is shown by heavy dashed lines.

Operation is as previously described, the pattern of interlace being, for example, successive preparation, injecting and filling of all molds I, II, III, IV, before product removal and recycling at I, followed by successive product removal and recycling at II, then at III, then at IV, and so on. The proper coordination of shot size for each unit location is suggested through limit switches 153, 154, 155, 156 all carried by beam 145 and actuated by lug or the like means on the adjacent end of carriage 148.

What is claimed is:

1. A multiple rotary casting machine for casting foamed-plastic tubular articles, comprising a frame, a plurality of rotary casting units in spaced relation to each other and each having coaxially spaced inner and outer mold members supported for rotation with respect to said frame, thereby establishing an annular mold space between said members of each casting unit, each casting unit further including end-closure wall members closing the respective longitudinal ends of said mold spaces, corresponding ends of corresponding end-closure members having a filler opening in registry with the mold space served thereby and therefore offset from the rotary axis, foamable mold-material supply means having a single elongate tubular discharge element sized for accommodation at a selected one of said filler openings, two-component frame-based movable support means mounting said supply means for selective positioning of said tubular discharge element for axial insertion via the selected filler opening and into the annular mold space, and rotary drive means for the respective casting units; whereby, after discharhge of foamable material into the mold space of a first casting unit and while foamed expansion and curing of such material are in process at said first casting unit, said supply means may be selectively repositioned within the mold space of a second casting unit and for service of the second casting unit to effect interlaced and concurrent casting procedures at both casting units; and actuating means operative during discharge-element insertion through a selected filler opening and controlling the volume of foamable material injected in each filler opening, said last-defined means including programmed means governing a selected program of operation of said supply means, said programmed means including first shot-size program means appropriate for the mold-space size of a first casting unit and second shot-size program means appropriate for the mold-space size of a second casting unit, and program-selection means responsive to position of said support means along said one axis and connected for selection of that one of said shot-size program means which is appropriate for the mold-space size to be served at the instantaneous position of said movable support means.

2. A multiple rotary casting machine for casting foamed-plastic tubular articles, comprising a frame, a plurality of rotary casting units in spaced relation to each other and each having coaxially spaced inner and outer mold members supported for rotation with respect to said frame, thereby establishing an annular mold space between said members of each casting unit, each casting unit further including end-closure wall members closing the respective longitudinal ends of said mold spaces, corresponding ends of corresponding end-closure members having a filler opening in registry with the mold space served thereby and therefore offset from the rotary axis, foamable mold-material supply means having a single elongate tubular discharge element sized for accommodation at a selected one of said filler openings, two-component frame-based movable support means mounting said supply means for selective positioning of said tubular discharge element for axial insertion via the selected filler opening and into the annular mold space, and rotary drive means for the respective casting units; whereby, after discharge of foamable material into the mold space of a first casting unit and while foamed expansion and curing of such material are in process at said first casting unit, said supply means may be selectively repositioned within the mold space of a second casting unit and for service of the second casting unit to effect interlaced and concurrent casting procedures at both casting units; and programmed means governing a selected program of operation of said supply means, said programmed means including first shot-size program means appropriate for the mold-space size of a first casting unit and second shot-size program means appropriate for the mold-space size of a second casting unit, and means including an electrical switch responsive to presence of said movable support means and associated with each of the shot-discharge locations of said movable support means along said one axis, each switch being operatively connected to a different one of said shot-size program means.

3. A multiple rotary casting machine for casting foamed-plastic tubular articles, comprising a frame, a plurality of rotary casting units in spaced substantially parallel relation to each other and each having coaxially spaced inner and outer mold members supported for rotation with respect to said frame, thereby establishing an annular mold space between said members of each casting unit, each casting unit further including end-closure wall members closing the respective longitudinal ends of said mold spaces, corresponding ends of corresponding end-closure members having a filler opening in registry with the mold space served thereby and therefore offset from the rotary axis, foamable mold-material supply means having a single elongate tubular discharge element sized for accommodation at a selected one of said filler openings, two-component frame-based movable support means mounting said supply means for selective positioning of said tubular discharge element for axial insertion via the selected filler opening and into the annular mold space, and rotary drive means for the respective casting units; whereby, after discharge of foamable material into the mold space of a first casting unit and while foamed expansion and curing of such material are in process at said first casting unit, said supply means may be selectively repositioned within the mold space of a second casting unit and for service of the second casting unit to effect interlaced and concurrent casting procedures at both casting units; and shot-size program means appropriate for the mold-space size of a first casting unit, an electrical limit switch positioned for operation when said movable support means is in position to serve said first casting unit, and an operative controlling connection from said switch to said program means.

4. The machine of claim 3, in which said shot-size program means is part of control means governing a selected program of operation of said supply means and of said rotary drive means, said control means including means for initiating a programmed cycle of operation, whereby when positioned at said first casting unit said control means determines the correct cycle complete with correct shot size for the mold space of said first casting unit.

5. The machine of claim 4, in which said shot-size program means includes selectively operable means for setting the same appropriate to a selected shot size.

6. A multiple rotary casting machine for casting foamed-plastic tubular articles, comprising a frame, a plurality of rotary casting units in spaced relation to each other and each having coaxially spaced inner and outer mold members supported for rotation with respect to said frame, thereby establishing an annular mold space between said members of each casting unit, each casting unit further including end-closure wall members closing the respective longitudinal ends of said mold spaces, corresponding ends of corresponding end-closure members having a filler opening in registry with the mold space served thereby and therefore offset from the rotary axis, foamable mold-material supply means having a single elongate tubular discharge element sized for accommodation at a selected one of said filler openings, two-component frame-based movable support means mounting said supply means for seletive positioning of said tubular discharge element for axial insertion via the selected filler opening and into the annular mold space, and rotary drive means for the respective casting units; whereby, after discharge of foamable material into the mold space of a first casting unit and while foamed expansion and curing of such material are in process at said first casting unit, said supply means may be selectively repositioned within the mold space of a second casting unit and for service of the second casting unit to effect interlaced and concurrent casting procedures at both casting units; at least one of said mold members for at least one casting unit comprising mold-lining support structure and mold-lining wall structure removably secured to said support structure, whereby by securing to said support structure a mold-lining sructure selected from a variety of sizes thereof, there can be selection of size of molded product, and shot-size program means associated with said one casting unit and including selectively operable means for setting the same appropriate to the correct shot size for the selected size of molded product.

7. The machine of claim 6, wherein said rotary casting units are arrayed on spaced substantially parallel axes and wherein said movable support means includes two-component guide means for which one component is orthogonal to said axes. pg,28

8. The machine of claim 6, wherein said mold-material supply means further includes longitudinal-displacement actuating means for said filling element and synchronized with operation of said supply means for controlling longitudinal distribution of foamable material within the mold space being served.

9. The machine of claim 6, wherein said one casting unit is one of a plurality of casting units that are similarly provided with mold-lining support structure and with mold-linig wall structure, and wherein each thus-equipped casting unit is operatively associated with said shot-size program means such that for each such casting unit shot size is automatically appropriate for the particular selected size of molded product.

10. The machine of claim 8, said actuating means including means limiting the volume of distributed foamable material, such limitation being to a preselected fraction of the mold space being served.

* * * * *